Patented Apr. 7, 1925.

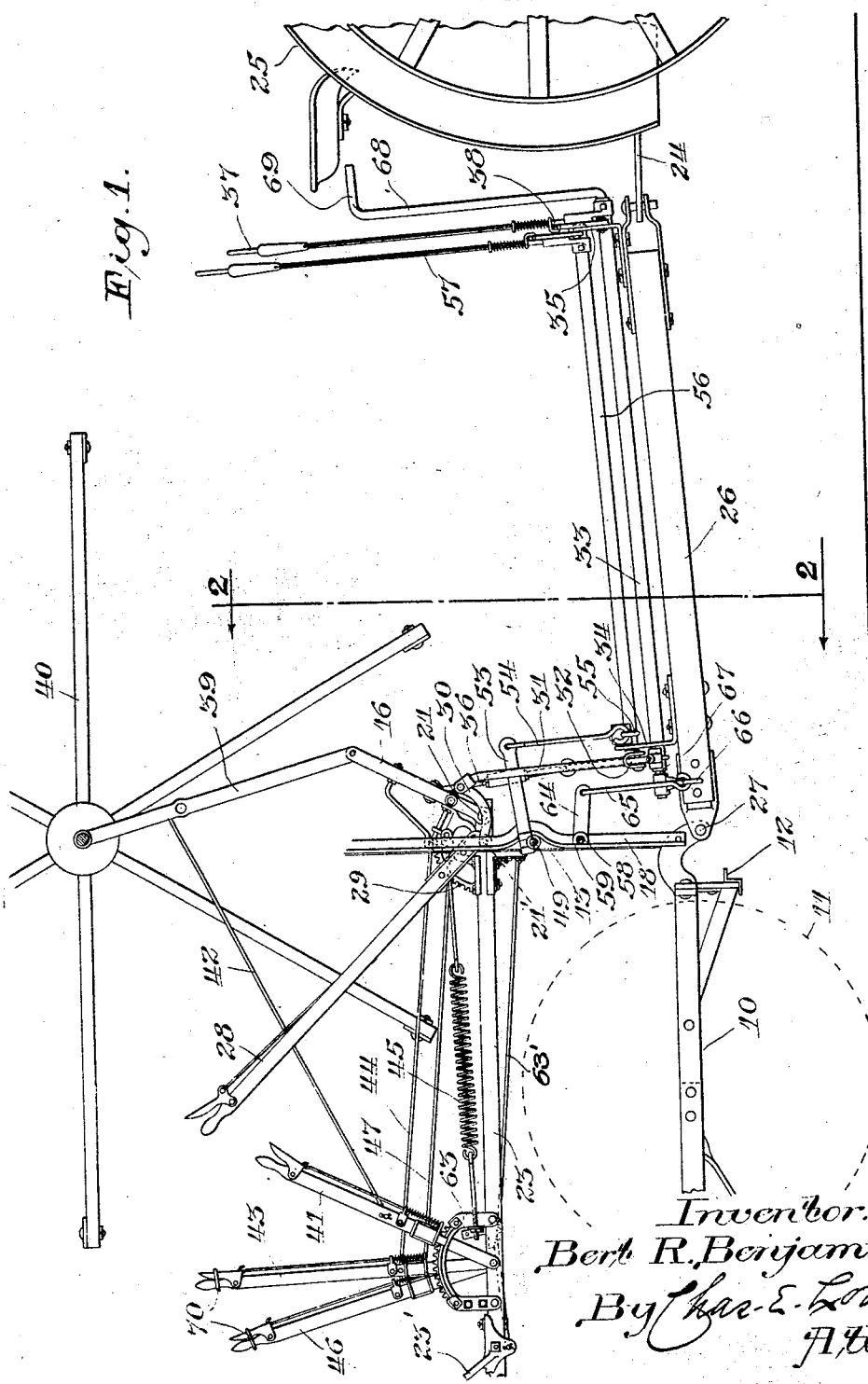

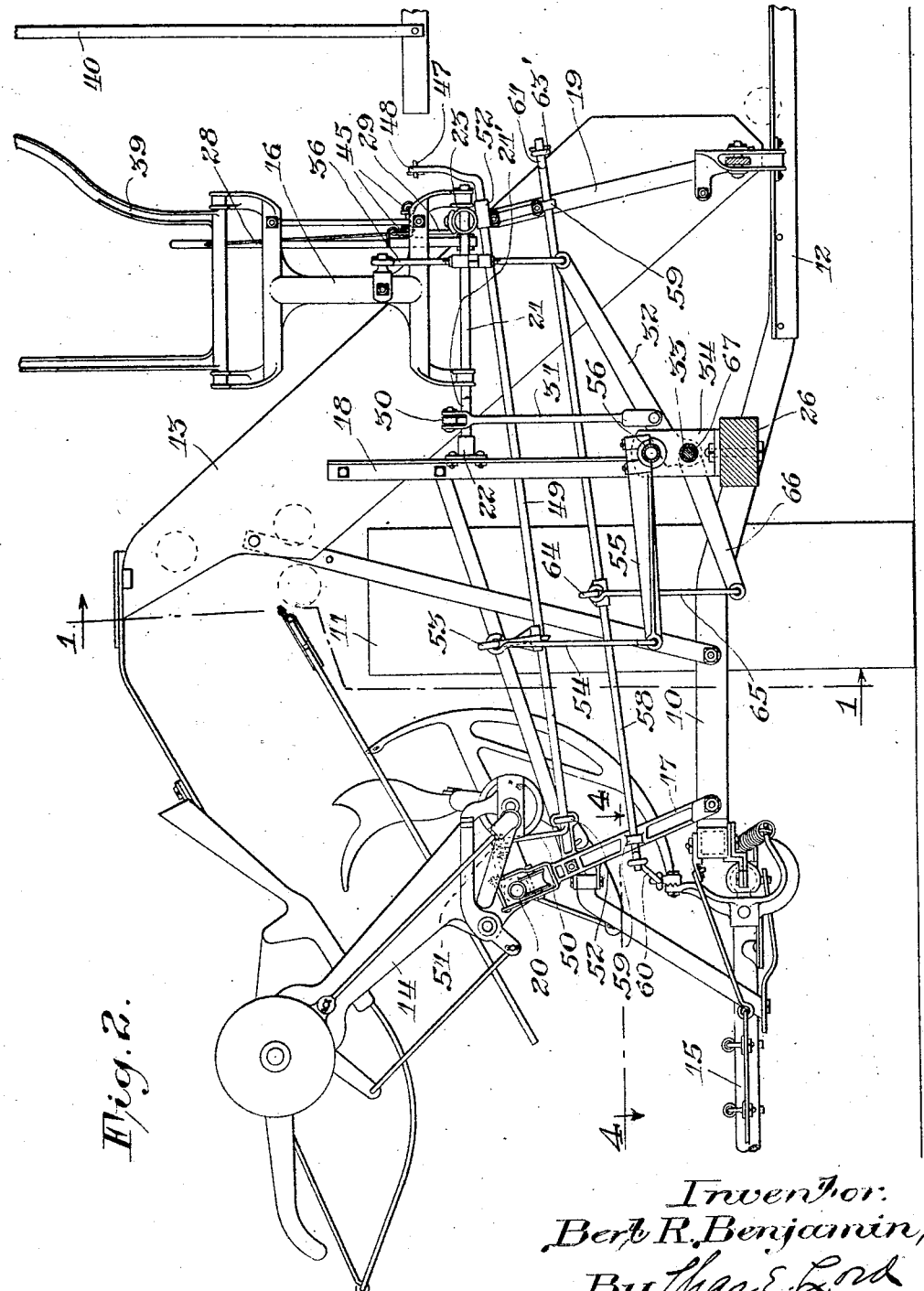

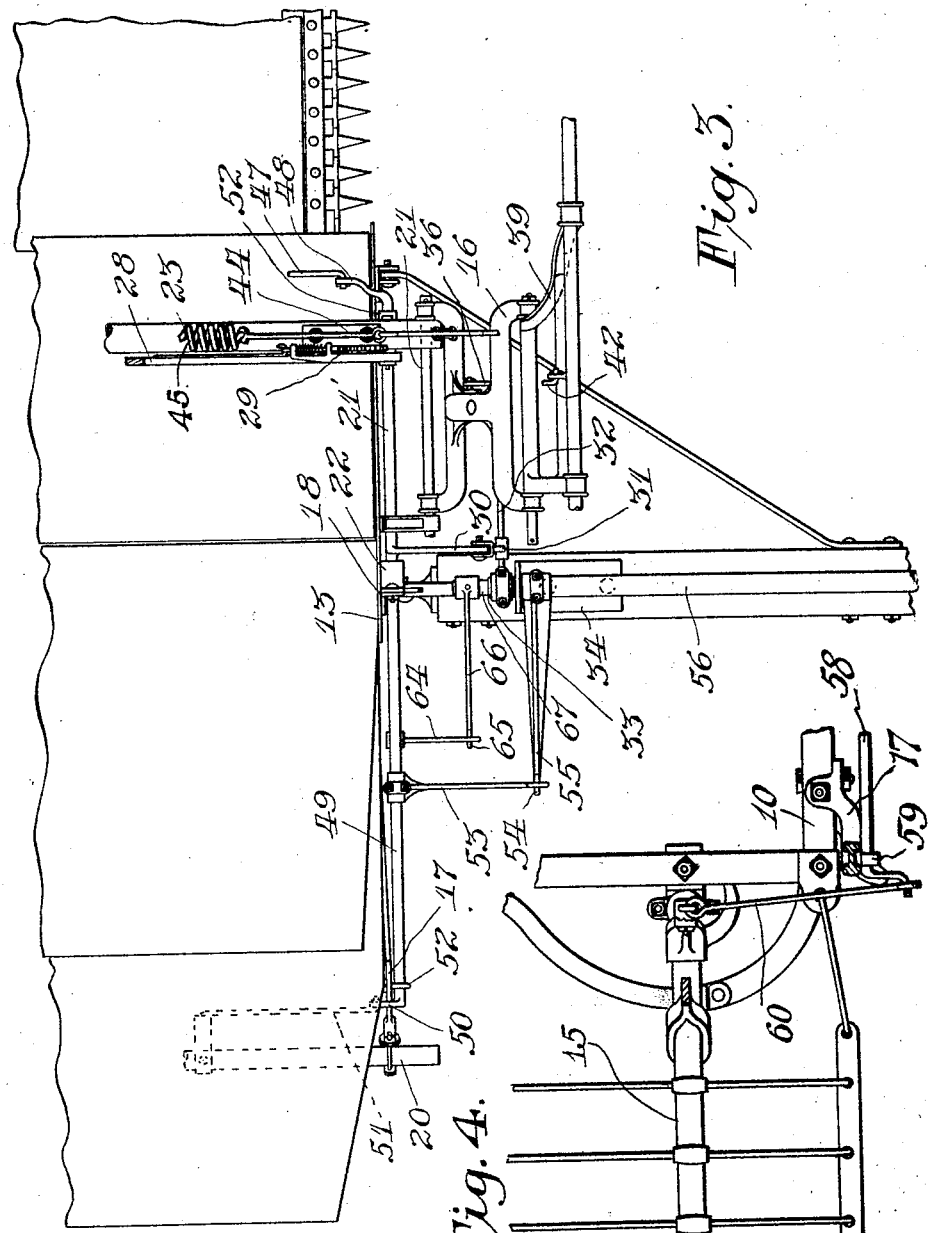

1,533,057

UNITED STATES PATENT OFFICE.

BERT R. BENJAMIN, OF OAK PARK, ILLINOIS, ASSIGNOR, BY MESNE ASSIGNMENTS, TO INTERNATIONAL HARVESTER COMPANY, A CORPORATION OF NEW JERSEY.

CONTROLLING MECHANISM FOR HARVESTERS.

Application filed July 19, 1918. Serial No. 245,725.

*To all whom it may concern:*

Be it known that I, BERT R. BENJAMIN, a citizen of the United States, residing at Oak Park, in the county of Cook and State of Illinois, have invented certain new and useful Improvements in Controlling Mechanism for Harvesters, of which the following is a full, clear, and exact specification.

My invention relates to controlling mechanism for harvesters and machines of like character.

In the usual type of harvester now in use, various adjustments are provided for; such, for instance, as the tilting of the harvester, raising and lowering of the reel, shifting of the binding mechanism, and control of the bundle carrying mechanism.

At the present time it is becoming more and more common to use power units or tractors to propel harvesters in the field, and unless an additional operator is to be employed, it becomes necessary to provide operative connections between the harvester and the power unit or tractor whereby a single operator may control the harvester adjustments from the tractor.

At times during the operation of the machine it is necessary or desirable that a plurality of adjustments be made simultaneously; for instance, in operating a harvester in short grain, the harvester should be tilted and the reel should be lowered in order to cut more straw and to properly deliver the straw to the platform apron.

One object of the present invention, therefore, is to provide a construction whereby the harvester and the operative elements carried thereby, may be adjusted from a plurality of locations, as for instance, from the operator's seat on the harvester, or from a suitable position on the tractor.

A further object is to provide improved controlling means for the harvester and for the operative elements carried by the harvester whereby a plurality of adjustments may be made simultaneously.

A further object is to provide means whereby a plurality of simultaneous adjustments may be made either from the harvester or from the tractor.

One embodiment of my invention is illustrated in the accompanying drawings, and in these drawings:—

Figure 1 illustrates in side elevation along line 2—2 of Fig. 2 the rear end of a tractor and the front end of a harvester showing the operative connections between these two machines for controlling the various adjustments of the harvester;

Fig. 2 is a front elevation along line 1—1 of Fig. 1 of the front end of a harvester, the connections between the harvester and the tractor being shown in section.

Fig. 3 is a plan of the front end of the harvester and controlling mechanism.

Fig. 4 is a plan view of the bundle carrier and its connections taken along line 4—4 of Fig. 2.

The harvester illustrated in connection with my invention is provided with the usual frame 10, harvester wheel 11, platform frame 12, elevator frame 13, binding mechanism 14, bundle carrier 15, and reel support 16. Vertical standards 17, 18 and 19 of any suitable construction are rigidly secured to the frame of the harvester, the standard 17 supporting the binding mechanism 14 which is carried by the binder pipe 20 which in turn is adjustably mounted upon the support 17. The standards 18 and 19 carry the reel supporting bracket 16 which is rotatably mounted upon a shaft 21 carried at one end by a bracket 22 secured to the standard 18, and at its opposite end by the usual seat pipe 23 supported on standard 19. A bracket 23' is carried by the pipe 23 and supports the usual seat (not shown). In my improved construction the draw bar 24 carried by the tractor 25 is connected by means of a draft member or tongue 26 to the front end of the harvester frame as shown at 27. The harvester is provided with the usual tilting mechanism which is operatively connected to a shaft 21'. This shaft is oscillated by means of a lever 28 which is secured thereto and is provided with the usual pawl locking mechanism which cooperates with the toothed sector 29. The shaft 21' supported on bracket 22 and seat pipe 23 has secured thereto and projecting forwardly therefrom, a crank arm 30, which is connected by a link 31 to an arm 32 secured at one end to a tubular member 33 turnably supported in brackets 34 and 35 carried by the draft member 26. The opposite end of the arm 32 is connected by means of an adjustable link 36 to the supporting bracket for the reel, which, as above stated, is turnably mounted on the shaft 21. The front end of the tubular member 33 has rigidly secured thereto a lever 37 provided with the usual pawl locking means which coacts with a toothed sector 38 to hold the lever in its adjusted position. The reel mechanism of the harvester has also the usual pivoted link connection 39 carried by the reel supporting bracket 16 and which in turn carries at its upper end the reel 40. An adjusting lever 41 of the usual construction is connected with the link 39 by means of a rod 42 and is manipulated to adjust the reel forwardly and backwardly with respect to the harvester frame. The reel supporting bracket 16 is also connected to a lever 43 by means of a rod 44, the usual pawl and sector locking means for this lever being also provided. Counterbalancing means 45 is secured at one end to the seat pipe 23 and at its opposite end to the reel supporting bracket 16.

The usual adjusting lever for the binder shifting mechanism is also provided and is shown at 46, this lever being connected by means of a rod 47 to a crank 48 formed at one end of a rod 49, the opposite end of the rod 49 having a crank 50 connected by a link 51 to the reciprocable carriage upon which the binding mechanism is supported in the usual manner. The rod 49 is journaled in suitable bearings 52 carried by the standards 17 and 19 secured to the machine frame. A connection is also provided whereby the binder shifting mechanism may be operated from the rear of the tractor, this connection including an arm 53 secured to the rod 49 and connected by means of a link 54 to a crank arm 55 carried by a tubular member 56. This tubular member is provided at its forward end with a lever 57 having the usual locking means, and by means of which it may be manipulated from the seat of the tractor.

The connections for controlling the position of the bundle carrier include a rod 58 journaled in suitable bearings 59 on the supports 17 and 19 and connected at one end by means of a link 60 to the bundle carrier, and at its opposite end provided with a crank 61 which in turn is connected to a foot treadle 63 by means of a link 63' by which the crank and rod are rotated to dump the bundle carrier.

The bundle carrier mechanism illustrated is shown merely for the purpose of disclosing a practical embodiment of my invention, and is identical in construction with that illustrated in Patent No. 440,687 to Baker, issued November 18, 1890. Since no novelty is claimed per se in the bundle carrier mechanism, a more complete illustration of this construction is not deemed necessary.

The rod 58 by means of which the bundle carrier is controlled, is also provided with operative connections by means of which it may be manipulated from the rear of the tractor, and these connections include a crank 64 connected by a link 65 and arm 66 to a rod 67 which in turn extends through the tubular member 33 and is provided on its front end with an upwardly extending arm 68, this arm having a forwardly extending projection or handle 69 disposed adjacent the seat of the tractor.

The operation of the various parts of the mechanism above described will be now set forth.

From the description given above it will be seen that the binder shifting mechanism, raising and lowering adjustment for the reel, bundle carrier adjustment, and harvester tilting adjustment, may be made from either of two positions, viz: from the position on the harvester frame, and from a position on the tractor frame. Assuming that the adjustments are to be made from the seat of the tractor, the binder shifting lever and the lever for raising and lowering the reel located on the harvester should be adjusted for free floating movement on their pivot by using some suitable means such as the rings 70 shown in Fig. 1, to hold the pawls out of locking engagement with their corresponding sectors. When this has been done the corresponding levers disposed adjacent the seat on the tractor may be manipulated. If the harvester is being operated in short grain or in tangled grain and it is desired to lower the reel and tilt the harvester downwardly, lowering the cutter bar, the lever 37 is shifted laterally with respect to the line of draft, and by means of the combined link connections from the arm 32 carried by the tubular member 33 which is connected to the lever 37, the harvester is tilted and the reel is lowered. Rocking of the shaft 33 thus is made to perform the two functions of platform and reel adjustment simultaneously. When the shaft as viewed in Fig. 2 is rocked in a clockwise direction it carries the lever 32 with it which exerts a pull, by means of the link 36, on the reel support 16 thereby rocking it downwardly on the shaft 21 to lower the reel. At the same time the lever 32 exerts a pull on the link 31 which in turn pulls the lever 30 rigid with the rock shaft 21'. This latter rock shaft, however, is held against rocking movement by the lever 28 locked to the toothed sector 29. As the shaft 21' is locked against rocking movement this force is applied in a downward direction on the shaft 33 carried in the bracket 34 resulting in breaking the pivotal connection between the platform and draft member 26 whereby the entire harvester frame is bodily lowered. In raising the reel and platform the reverse movements are effected by rocking the shaft 33 in an anti-clockwise direction. The lever 57 is swung laterally to adjust the binding mechanism forwardly and backwardly on the harvester frame, and the bundle carrier is manipulated by the movement of the handle 69 carried by arm 68. It will be noted that the arm 68 and levers 37 and 57 are located within easy reach of the operator of the tractor, and since these levers are mounted for lateral movement, their adjustment may be easily and quickly made without interrupting the progress of the tractor and the trailing machine.

In order to disconnect the harvester or trailing machine from the tractor it is necessary merely to disconnect the link connections 31, 36, 54 and 65 and the harvester may then be operated as a separate unit.

From the above description it will be seen that a simple and efficient construction has been provided for accomplishing the desired purpose, and a construction having few parts and by means of which the various adjustments may be made quickly and expeditiously.

While I have in the above specification described one embodiment which my invention may assume, it should be understood that the invention is capable of modification and that modification may be made without departing from the spirit and scope of the invention as expressed by the following claims:

1. In combination, a harvester, adjusting mechanisms carried thereby, a draft member connected to the harvester and adapted for connection to a tractor, and single means supported on said draft member for simultaneously actuating a plurality of said mechanisms.

2. In combination, a harvester, adjusting mechanisms carried thereby, a tractor, and single means supported adjacent said tractor for simultaneously actuating a plurality of said mechanisms.

3. In combination, a harvester, adjusting mechanisms carried thereby, means carried by said harvester for simultaneously adjusting a plurality of said mechanisms, a tractor, and means supported adjacent said tractor for simultaneously actuating a plurality of said mechanisms.

4. In combination, a harvester, tilting mechanism carried thereby, reel adjusting mechanism carried thereby, a draft member connected to the harvester, and means supported on said draft member for simultaneously actuating both of said mechanisms.

5. In combination, a harvester, tilting mechanism carried thereby, reel adjusting mechanism carried thereby, a draft member, and single means supported on said draft member and operatively connected to said mechanism for simultaneously actuating both of said mechanisms.

6. In combination, a harvester, adjusting mechanisms carried thereby, means carried by said harvester for simultaneously adjusting a plurality of said mechanisms, a tractor and a single lever mechanism supported adjacent said tractor for simultaneously actuating a plurality of said mechanisms.

7. In combination, a harvester, adjusting mechanisms carried thereby, a tractor, a draft member connecting said tractor to said harvester, and single means carried by said draft member for simultaneously actuating a plurality of said adjusting mechanisms.

8. In combination, a harvester, adjusting mechanisms carried thereby, a tractor, a draft member connecting said tractor to said harvester, and a laterally movable lever carried by the draft member for simultaneously actuating a plurality of said adjusting mechanisms.

9. In combination, a harvester, adjusting mechanisms carried thereby, a tractor, and laterally movable means supported adjacent said tractor for simultaneously actuating a plurality of said mechanisms.

10. In combination, a harvester, adjusting mechanisms carried thereby, a tractor, a draft member connecting said harvester to said tractor, and laterally movable means carried by said draft member for actuating a plurality of said adjusting mechanisms.

11. In combination, a harvester, adjusting mechanisms carried thereby, a draft member connected to said harvester and adapted to be connected to a tractor, a plurality of rock shafts carried by said draft member and connected to said adjusting mechanisms, and means for actuating said rock shafts.

12. In combination, a harvester, adjustable mechanisms carried thereby, a tractor, a draft member connecting said harvester and said tractor, means supported on said draft member and including a tubular connecting member for actuating one of said adjusting mechanisms, and means including a connecting member mounted in said tubular member for actuating another of said adjusting mechanisms.

13. In combination, a harvester, adjusting mechanisms carried thereby, a tractor, operative connections between said tractor and said harvester, and means including a single crank arm adjacent the tractor whereby a plurality of said mechanisms may be adjusted from said tractor.

14. In combination, a harvester, adjusting mechanisms carried thereby, a tractor, a draft member connecting said harvester and said tractor, a turnable member carried by said draft member, means adjacent said tractor for turning said member, a crank arm carried by said turnable member, and link connections between said arm and separate parts of said harvester whereby turning of said member will actuate a plurality of said adjusting mechanisms.

15. In combination, a harvester, tilting mechanism for said harvester, reel adjusting mechanism, a draft member, and means supported on said draft member including a single crank arm for actuating said tilting mechanism and said reel adjusting mechanism.

16. In combination, a harvester, adjusting mechanism carried thereby, a draft member connected to the harvester and adapted for connection to a tractor, means carried by the draft member for actuating the adjusting mechanism, said means comprising a longitudinally extending turnable member and a laterally movable operating member.

17. In an attachment for harvesters having an adjusting mechanism, the combination of a draft member adapted for connection to the harvester, a turnable member mounted on the draft member, a crank arm carried by the turnable member and adapted for connection to the adjusting mechanism, and a laterally movable actuating member carried by the turnable member.

18. In a device of the class described, a tractor frame, a frame for supporting an independent mechanism, a hitch device connected with one of said frames for pivotal movement in one direction, and with the other of said frames for pivotal movement in another direction, and a rock shaft mounted longitudinally on said hitch, said shaft being provided at one end with a lever to operate transversely, and at the other with means for controlling one of said pivotal movements.

19. In a structure of the class described, the combination of a binder frame, a hitch device connected with said frame for pivotal movement in a vertical direction, means on said hitch device for tilting said binder frame, comprising a longitudinal rock shaft having the end adjacent to the binder frame provided with a laterally extending and horizontally arranged arm, and a vertical link operatively connected between said arm and said binder frame, the opposite end of said rock shaft being provided with a transversely operated lever near the free end of said hitch device.

In testimony whereof I affix my signature.

BERT R. BENJAMIN.